(12) United States Patent  
Goffman

(10) Patent No.: US 8,973,880 B2  
(45) Date of Patent: Mar. 10, 2015

(54) CLAMP

(75) Inventor: Daniel L. Goffman, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 72 days.

(21) Appl. No.: 13/361,075

(22) Filed: Jan. 30, 2012

(65) Prior Publication Data

US 2013/0193289 A1 Aug. 1, 2013

(51) Int. Cl.
*A47F 5/00* (2006.01)

(52) U.S. Cl.
USPC ..................................... 248/230.4; 248/230.6

(58) Field of Classification Search
USPC ............... 248/231.51, 231.71, 231.81, 316.5, 248/316.7, 230.4, 230.6, 230.7; 24/20 EE, 24/16 PB
See application file for complete search history.

(56) References Cited

U.S. PATENT DOCUMENTS

| | | | |
|---|---|---|---|
| 3,913,187 A | 10/1975 | Okuda | |
| 4,061,299 A * | 12/1977 | Kurosaki | 248/73 |
| 4,240,604 A | 12/1980 | Brach | |
| 4,249,529 A | 2/1981 | Nestor et al. | |
| 4,260,123 A | 4/1981 | Ismert | |
| 4,291,855 A | 9/1981 | Schenkel et al. | |
| 4,295,618 A | 10/1981 | Morota et al. | |
| 4,386,752 A | 6/1983 | Pavlak et al. | |
| 4,478,381 A | 10/1984 | Pittion et al. | |
| 4,624,432 A | 11/1986 | Salacuse | |
| 4,653,716 A * | 3/1987 | Sakaguchi | 248/316.5 |
| 4,728,071 A | 3/1988 | Salacuse | |
| 4,763,390 A | 8/1988 | Rooz | |
| 4,802,646 A | 2/1989 | Cattani | |
| 4,955,574 A | 9/1990 | Freier | |
| 5,094,578 A | 3/1992 | Light et al. | |
| 5,277,387 A | 1/1994 | Lewis et al. | |
| 5,305,978 A | 4/1994 | Current | |
| 5,490,651 A | 2/1996 | Kump | |
| 5,494,245 A | 2/1996 | Suzuki et al. | |
| 5,572,776 A | 11/1996 | Murphy et al. | |
| 5,697,585 A | 12/1997 | Hungerford, Jr. | |
| 5,794,896 A | 8/1998 | Hungerford, Jr. | |
| 5,820,048 A | 10/1998 | Shereyk et al. | |
| 5,906,342 A | 5/1999 | Kraus | |
| 6,052,873 A | 4/2000 | Cuno | |

(Continued)

FOREIGN PATENT DOCUMENTS

| | | |
|---|---|---|
| DE | 4031237 A1 | 4/1992 |
| DE | 10 2009 016884 01 | 10/2010 |
| EP | 1 696 164 A2 | 8/2006 |

(Continued)

OTHER PUBLICATIONS

International Search Report for PCT/US2013/023103, Claas Fritzen, European Patent Office, Apr. 5, 2013, 5 pages.

(Continued)

*Primary Examiner* — Alfred J Wujciak
(74) *Attorney, Agent, or Firm* — Faegre Baker Daniels LLP

(57) ABSTRACT

A clamp is disclosed for coupling an accessory to a tube. The clamp includes a base configured to receive an accessory, and first and second arms rotatably coupled to the base by way of flexible members. Another flexible member adjoins ends of the first and second arms to define a continuous clamping surface for receiving the tube. The clamping surface has a size substantially identical to an outer diameter of the tube. A locking system is configured to restrict rotational and lateral movement of the first and second arms relative to each other.

19 Claims, 6 Drawing Sheets

(56) References Cited

U.S. PATENT DOCUMENTS

| | | | |
|---|---|---|---|
| 6,059,245 A * | 5/2000 | Hermansen et al. | ....... 248/311.2 |
| 6,164,604 A | 12/2000 | Cirino et al. | |
| 6,212,742 B1 | 4/2001 | Baskin | |
| 6,460,813 B1 | 10/2002 | Gretz | |
| 6,601,802 B1 | 8/2003 | Howe | |
| 6,676,091 B2 | 1/2004 | Hauer | |
| 6,780,195 B2 | 8/2004 | Porat | |
| 6,899,304 B2 | 5/2005 | Bellmore et al. | |
| 6,978,973 B1 | 12/2005 | Gretz | |
| 7,007,900 B2 | 3/2006 | Goodwin et al. | |
| 7,621,488 B2 | 11/2009 | Miller | |
| 7,658,351 B2 | 2/2010 | Hansen | |
| 7,661,631 B2 | 2/2010 | Ibaraki | |
| 7,717,900 B2 | 5/2010 | Di Palma | |

FOREIGN PATENT DOCUMENTS

| | | |
|---|---|---|
| GB | 2 183 287 A | 6/1987 |
| WO | WO2008079368 | 7/2008 |

OTHER PUBLICATIONS

Written Opinion for PCT/US2013/023103, Claas Fritzen, European Patent Office, Apr. 5, 2013, 7 pages.

Caddy Cushion Clamp, ERICO product literature; (available at Internet address: http://www.erico.com); date unknown; 2 pages.

Universal Roll Cage Mounting Bracket—6mm Bolt; product information; (available at Internet address: http://www.traderhank.com/universal-roll-cage-mounting-bracket-6mm-bolt.html), date unknown; 2 pages.

Hansen, Michael, *Overmolding: A Multifaceted Medical Device Technology*, Medical Device and Diagnostic Industry, Jan. 2006, copyright 2006 Canon Communications LLC, 5 pages, available at http://www.mack.com/resource/Overmolding.pdf.

http://en.wikipedia.org/wiki/Injection_molding#cite_note-Bryce-8, citing Bryce, Douglas M., *Plastic Injection Molding: Manufacturing Process Fundamentals*, Society of Manufacturing Engineering, 1996.

* cited by examiner

CLAMP

BACKGROUND

The present disclosure relates to an accessory mounting structure for mounting accessories to an ATV, or other like vehicles.

Current accessory latching systems require bolting the accessory to a rack or other portion of an ATV, a process that can require a significant amount of time and effort. Generally this requires taking a plate, such as a flat steel plate, and placing it on the bottom side of an ATV rack, such as a steel tube rack or a composite rack, and then sandwiching the rack with another plate on top of the rack and fastening the two plates together with U-bolts or some other type of fastener. An accessory can then be mounted to the rack above or to the top plate. This system is expensive and the mounting process is very laborious and time consuming. Further, the inaccessibility to the bottom side of the rack plus the amount of time it takes putting the plate on the bottom and running bolts up through the bottom plate make this system undesirable.

Other latching or clamping systems are known as "P-clamps" which are in the shape of the letter "P". Typically, the clamp is metallic and forms a continuous shape where a circular opening is formed to loop around a pipe or tube.

Attaching accessories or any other item to an ATV needs to be cost effective and simple. These latching systems must also be able to handle the rigor and generally "dirty" environment that an ATV is designed for. The capability to quickly attach and remove an item from the rack or other portion of an ATV will significantly improve the quality and functionality of the accessories.

SUMMARY

In one embodiment, a clamp is provided for coupling an accessory to a tube, the clamp comprising a base configured to receive the accessory; a first arm rotatably coupled to the base and having a first end and a second end; a second arm rotatably coupled to the base and having a first end, a second end, and a length approximately equal to a length of the first arm; at least one flexible member adjoining the second ends of the first and second arms to define a continuous clamping surface for receiving the tube, the clamping surface having a size substantially identical to an outer diameter of the tube; and a locking system configured to restrict rotational and lateral movement of the first and second arms relative to each other.

In another embodiment, a clamp is provided for coupling an accessory to a tube, the clamp comprising a base configured to receive the accessory; a first arm rotatably coupled to the base and having a first end and a second end; a second arm rotatably coupled to the base and having a first end and a second end; at least one flexible member adjoining the second ends of the first and second arms to define a continuous clamping surface for receiving the tube; and a latching system coupled to the first ends of the first and second arms, the latching system including a first set of complementary interfering surfaces and a second set of complementary interfering surfaces, wherein the first set maintains the first and second arms in a rotationally-closed position, and the second set maintains the first and second arms in a laterally-aligned position.

In another embodiment, a clamp is provided for coupling an accessory to a tube, the clamp comprising a base configured to receive the accessory; a first arm rotatably coupled to the base and having a first end and a second end; a second arm rotatably coupled to the base and having a first end and a second end; at least one flexible member adjoining the second ends of the first and second arms to define a continuous clamping surface for receiving the tube; and a closure member coupled to one of the first arm and the second arm and cooperating with a latch to close the clamp.

DETAILED DESCRIPTION

Figure 1:
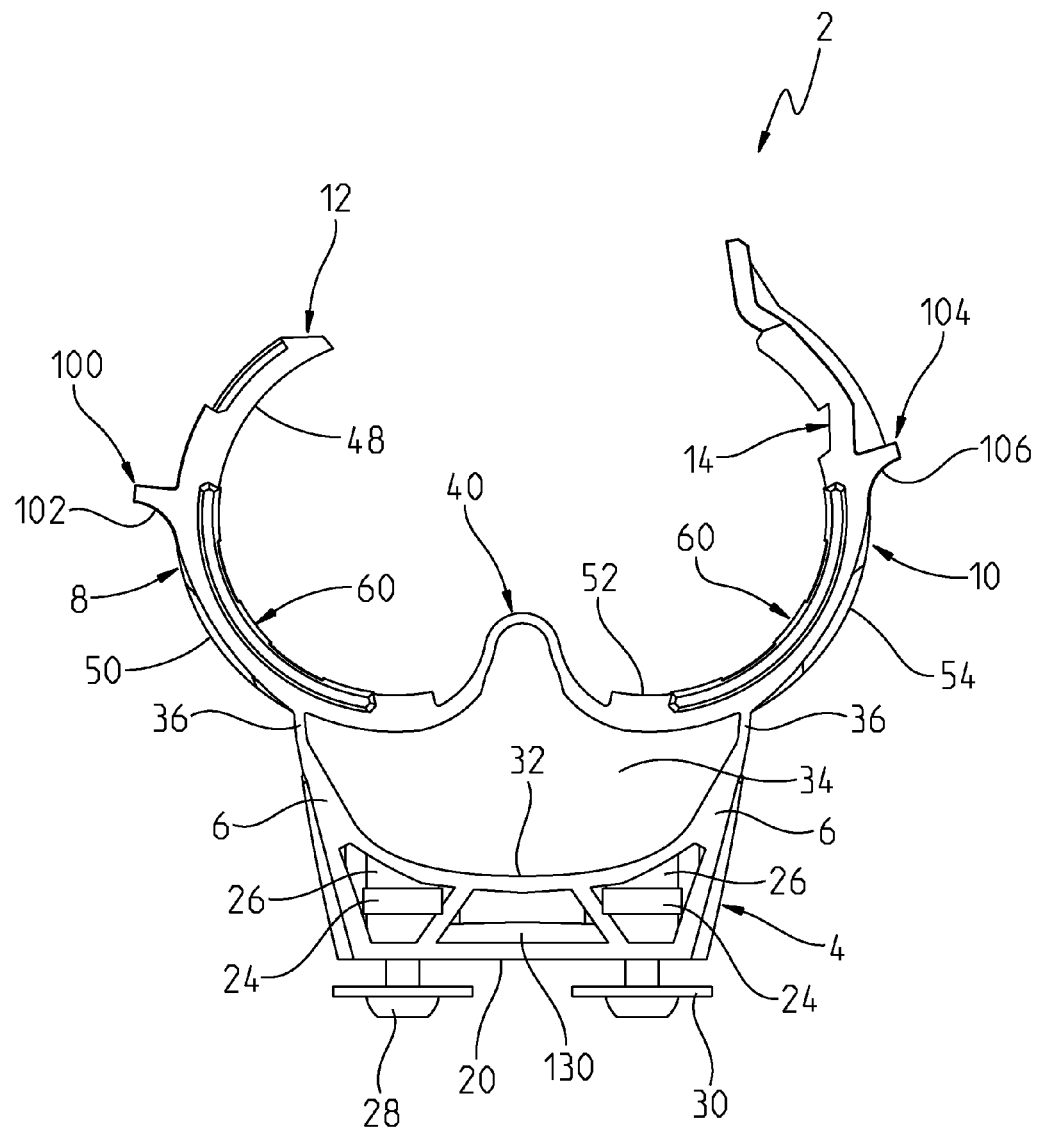
FIG. 1 shows a front view of the clamp.

With respect first to FIG. 1, clamp 2 is generally comprised of a clamp base 4 having support arms 6, clamp arms 8, 10, and latching elements 12, 14. With reference still to FIG. 1, base 4 includes mounting surface 20 which includes mounting apertures 22 (FIG. 9) which communicate with threaded inserts 24, located in pockets 26. It should be appreciated that a fastener such as a bolt 28 can be threadably received through apertures 22 and into threaded inserts 24 for attachment of clamp 2 to a surface. Further fastening elements such as washers 30 can also be used as known in the art. As shown best in FIG. 1, base 4 includes an upper arcuate surface at 32 which defines a receiving space 34, intermediate base 4 and clamp arms 8, 10. Finally, base 4 is defined with flexible members at 36 (also referred to as living hinges), which couples clamp arms 8 and 10 to base 4.

With respect now to FIGS. 1 and 2, clamp arms 8 and 10 will be described in greater detail. It should be understood that clamp arms 8 and 10 are rotatably movable about flexible members 36 and are connected to each other about a third flexible member 40. Said differently, clamp arm 8 is movable in a clockwise position towards clamp arm 10, while clamp arm 10 is movable in a counter-clockwise position towards clamp arm 8, as referenced from the positions of clamp arms 8 and 10 shown in FIG. 1. Clamp arms 8 and 10 are constructed of a generally arcuate shape with clamp arm 8 having an inner arcuate surface 48 and an outer arcuate surface 50; while clamp arm 10 includes an inner arcuate surface 52 and an outer arcuate surface 54. In the embodiment described, the base 4, support arms 6 and clamp arms 8, 10 are molded from an impact modified UV stable RTP nylon.

Figure 2:
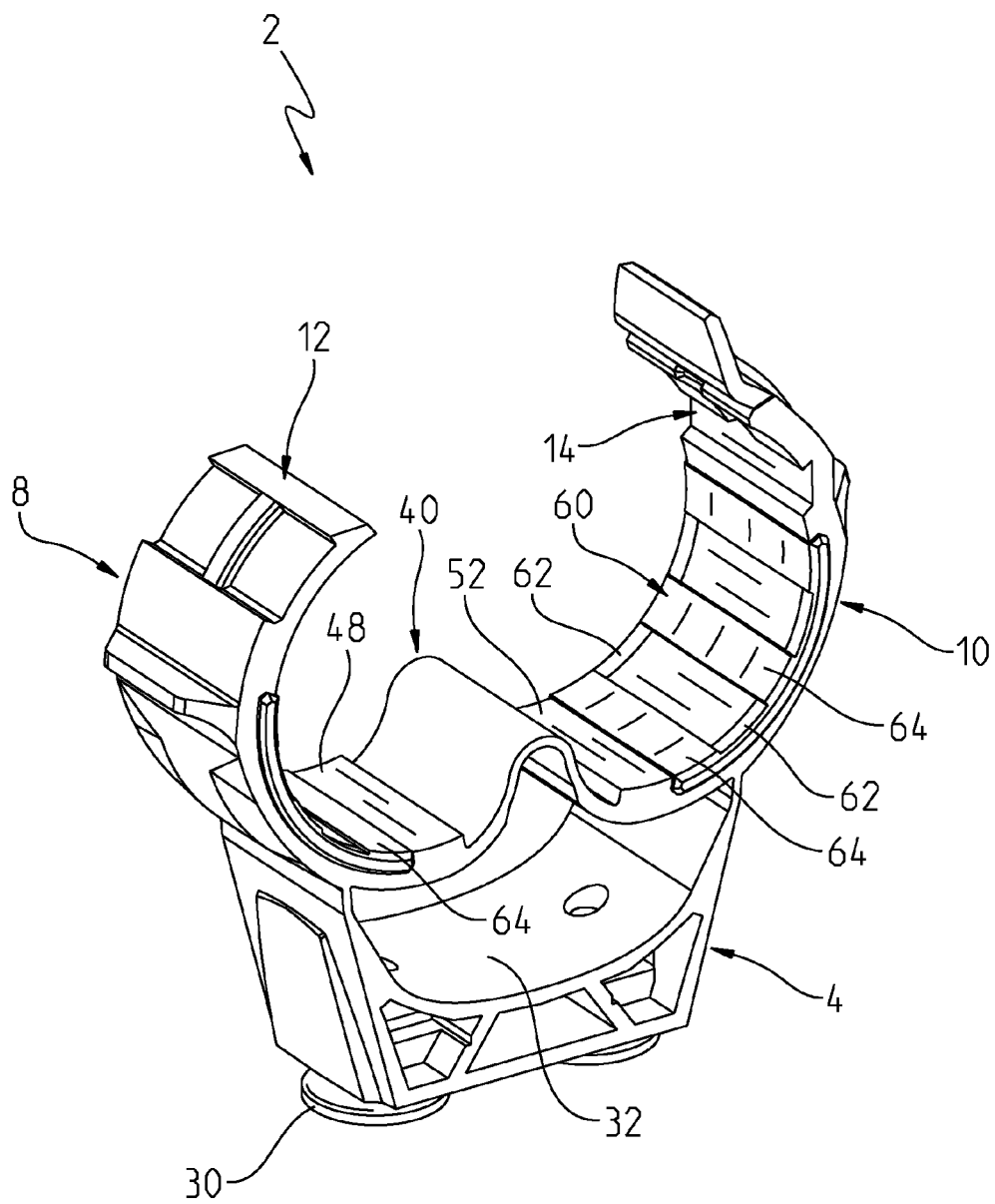
FIG. 2 shows a front perspective view of the clamp.
Figure 7:
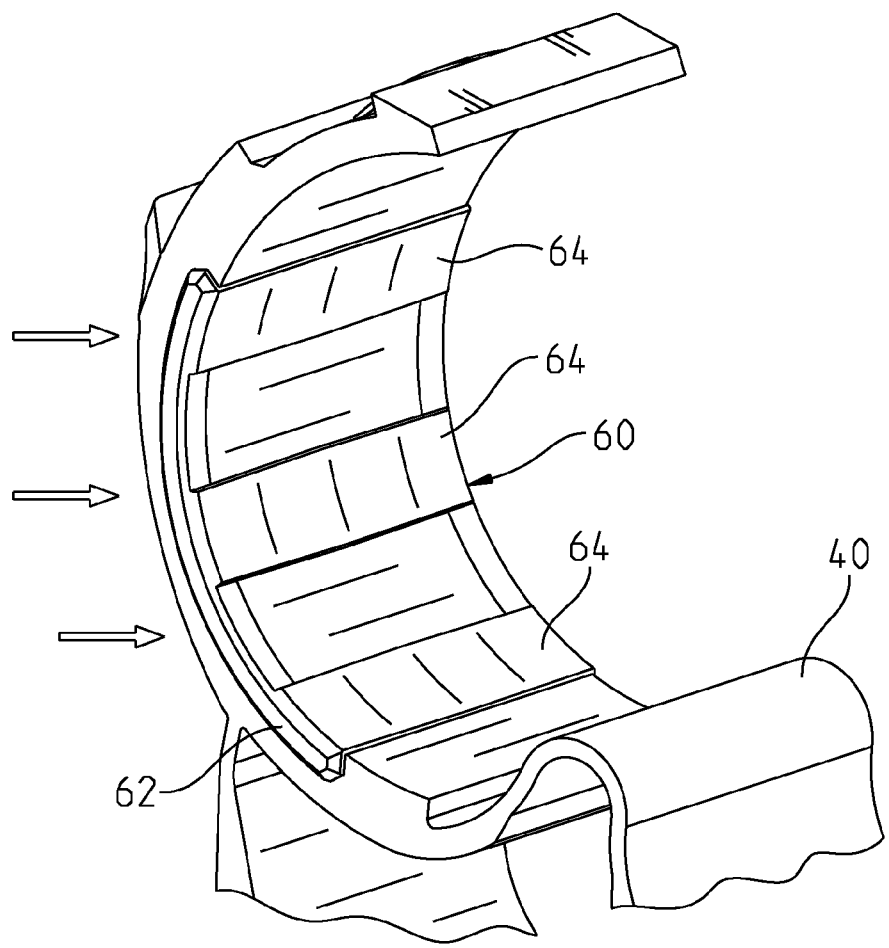
FIG. 7 shows a prospective view of the inner-clamping surfaces.

As best shown in FIG. 2, each inner arcuate surface 48 and 52 includes an over-molded resiliently grippable member 60. In the embodiment shown, the gripping member 60 is comprised of a Tekbond® elastomer material available from Teknor Apex Thermoplastic Elastomer Division. As also shown in FIGS. 2 and 7, each of the over-molded resilient gripping members 60 includes circumferential strips 62 and radial strips 64. As shown, each of the radial strips is molded to a height higher than the adjacent inner surfaces 48, 52, respectively, which resultantly reduces the inner diameter between the clamp arms.

Figure 3:
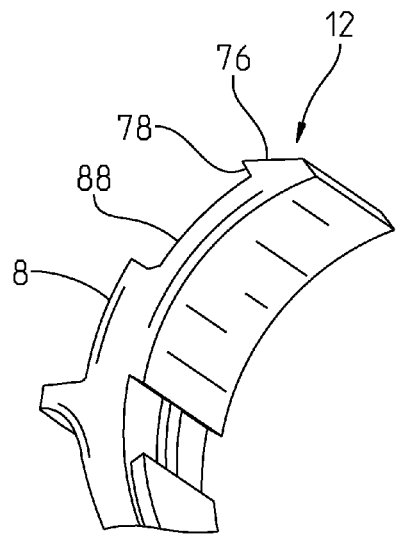
FIG. 3 shows an enlarged view of one portion of the latching assembly.
Figure 4:
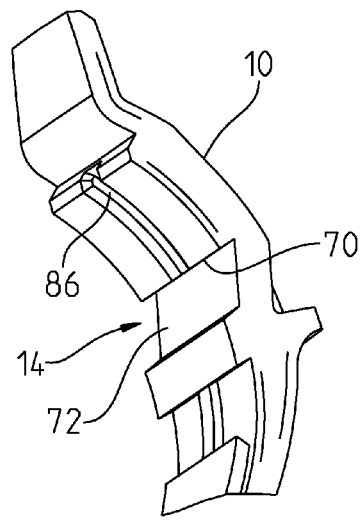
FIG. 4 shows the corresponding latching member for the latching assembly.

With respect now to FIGS. 3 and 4, latching element 14 is provided at an outer end of clamp arm 10 on the inner surface 52 of clamp arm 10. As shown, latch element 14 is provided with a latching surface 70 and a recessed surface 72. As shown best in FIGS. 2 and 3, latch element 12 is defined by a ramped surface 76 and a latching surface 78. It should be appreciated that ramped surface 76 is receivable against surface 72 and surfaces 70, 78 engagably latch together to retain the clamp in a closed position.

Figure 5:
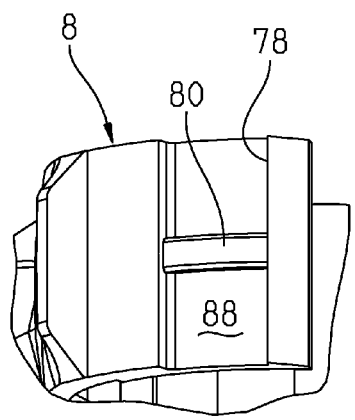
FIG. 5 shows one portion of a lateral alignment assembly.
Figure 6:
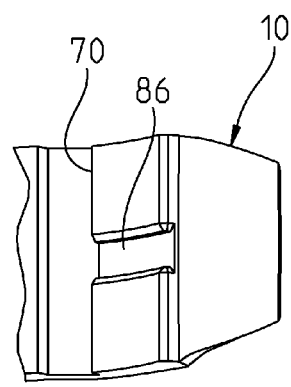
FIG. 6 shows the counterpart portion of the lateral alignment assembly.

As shown in FIGS. 5 and 6, a lateral alignment assembly is shown comprised of a circumferentially extending raised bar 80 which extends from a position behind latch surface 78 extending radially away from surface 88. Latch arm 10 includes a recess 86 (FIG. 6) positioned forward of latch surface 70 and profiled to receive raised bar 80, as described herein. Alignment of raised bar 80 with recess 86 prevents lateral movement of clamp arms 8, 10 relative to each other. This prevents the latch arms 8, 10 from sliding laterally and keeps the latching surfaces 70, 78 aligned and engaged.

Figure 9:
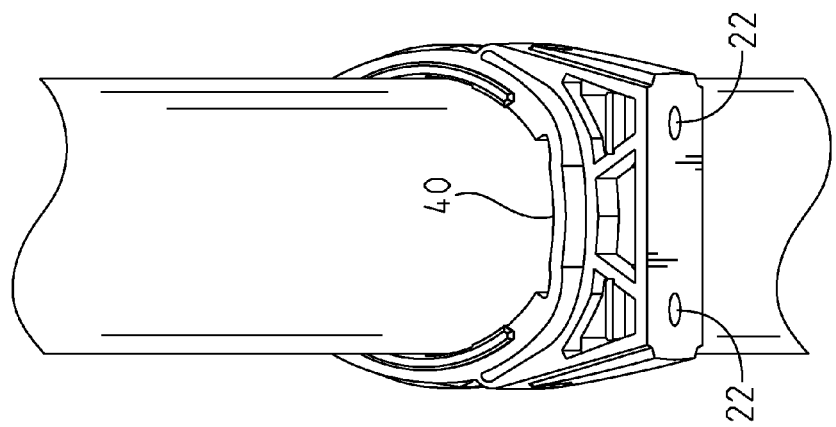
FIG. 9 shows the clamp of FIG. 8 with the tube in a clamped condition.
Figure 8:
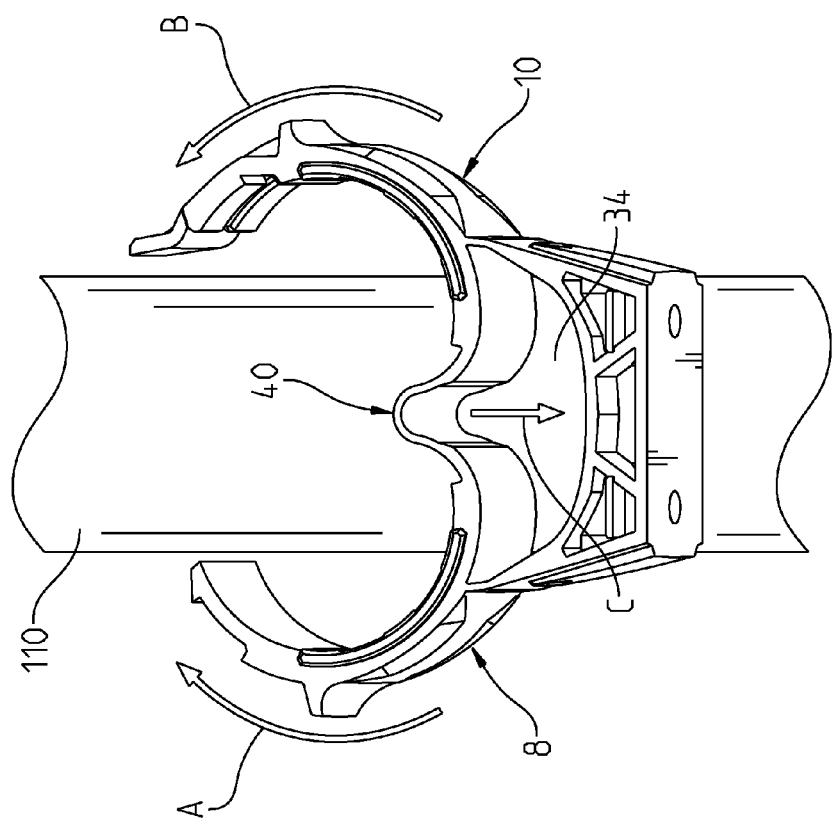
FIG. 8 shows an underside perspective view of the clamp with a tube being received in the clamp of FIG. 1.
Figure 10:
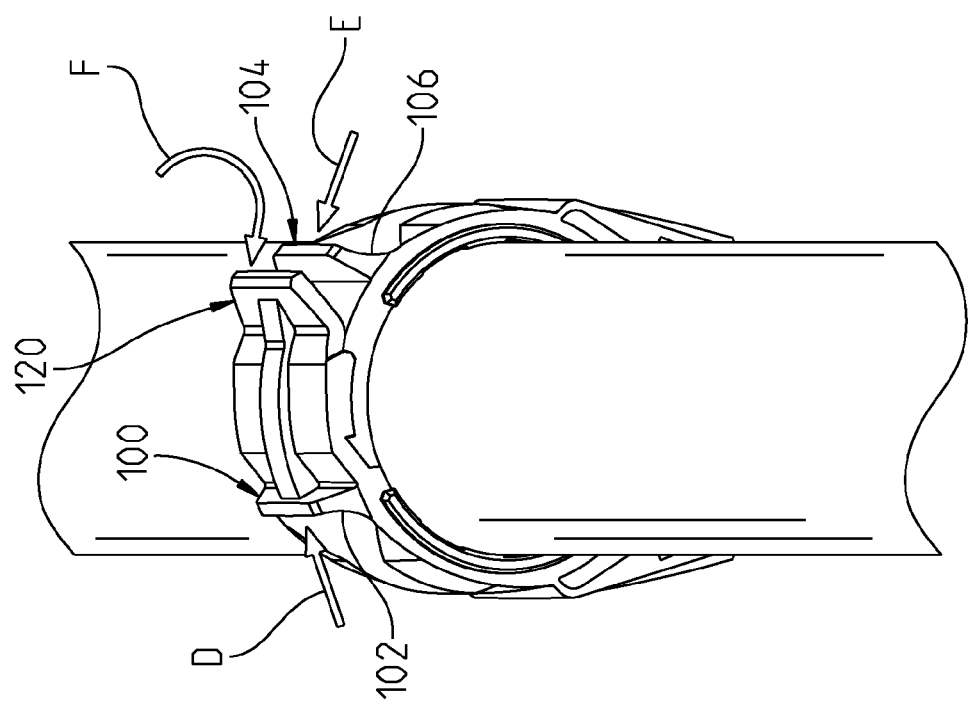
FIG. 10 shows an upper perspective view of the clamp in the fully locked position on the tube.

With reference now to FIGS. 1, 8-10, the operation of clamp 2 will be described in greater detail. With reference first to FIG. 1, it should be appreciated that the clamp provides an opening between the ends of clamp arms 8 and 10. With reference to FIG. 8, the clamp arms 8 are receivable around a tube 110, to a position where tube contacts flexible member 40. Continued movement of clamp 2 causes a rotation of the clamp arms towards each other (as shown by arrows A, B) and causes flexible member 40 to extend downwardly into receiving area 34 as shown in FIG. 9. Flexible member 40 flattens out to the position of FIG. 9, having moved in the direction of Arrow C in FIG. 8. At this point, gripping members 100, 104 can be gripped by placing fingers against the gripping surfaces 102, 106 and closing the clamp into a closed position as shown in FIG. 10, by a force in the direction of Arrows D, E. Disconnection of the latch 2 is accomplished by an upward force against tongue 120 (FIG. 10) releasing the latching assembly.

Thus this clamp allows for easy connection and disconnection of accessory components to round tubes. For example, in the case of a utility vehicle having an overhead canopy provided by a plurality of round tubes, items could include but not be limited to windshields, roofs, rear panels, rear view mirrors, dome lights, cup holders, GPS, cameras, cell phone mounts and/or headrests can easily be attached to the round tubes and carried on the vehicle. It should also be understand that the fasteners 28, 30 need not be used but rather a Velcro® strap could be positioned through slot 130 to retain such items to the clamp 2. For example, items that are frequently removed, shovels, fishing poles, etc. could be held by the Velcro® straps. Button type straps could also be used.

Through the use of three living hinges 36, 36, and 40, the clamp 2 remains open prior to installation against tube 100. When the clamp is set on the tube, the flattening of the flexible member 40 causes the rotation of the clamp arms 8, 10 towards the closed position. Positive locking is made by way of the latching assembly which prevents movement of the arms 8, 10 either circumferentially or laterally. The addition of the Tekbond® rubber overmold allows the clamp to grip the tube and prevent it from rotation about the tube.

It should be understood that while the application is discussed for use in the powersports industry, other applications are also possible. For example, and not to be limiting, the clamp 2 could also be used in motorcycle, bicycle and marine applications.

The invention claimed is:

1. A clamp for coupling an accessory to a tube, the clamp comprising:
 a base configured to receive the accessory;
 a first arm rotatably coupled to the base and having a first end and a second end;
 a second arm rotatably coupled to the base and having a first end, a second end, and a length approximately equal to a length of the first arm;
 a first flexible member adjoining the second ends of the first and second arms to define a continuous clamping surface for receiving the tube, the clamping surface having a size substantially identical to an outer diameter of the tube;
 a second flexible member coupling the first arm to the base;
 a third flexible member coupling the second arm to the base; and
 a locking system configured to restrict rotational and lateral movement of the first and second arms relative to each other, the locking system is coupled to the first ends of the first and second arms, the locking system includes a first set of complementary interfering surfaces and a second set of complementary interfering surfaces, wherein the first set restricts the rotational movement of the first and second arms, and the second set restricts the lateral movement of the first and second arms, and the first set of complementary interfering surfaces is circumferentially adjacent the second set of complementary interfering surfaces.

2. The clamp of claim 1, wherein the second set is comprised of a circumferentially raised bar and complementary recess.

3. The clamp of claim 1, wherein one of the first or the second arm is comprised of a raised gripping surface.

4. The clamp of claim 3, wherein the raised gripping surface is comprised of an overmolded gripping member.

5. The clamp of claim 1, further comprising a closure member coupled to one of the first arm and the second arm and cooperating with the locking system to close the clamp, the closure member is positioned radially outward of the locking system.

6. The clamp of claim 1, wherein the first flexible member is looped upward into an opening between the first and second arms, and wherein the first, second and third flexible members maintain the first and second arms in an open position when in an unattached condition and cause the arms to close when in an attached condition.

7. A clamp for coupling an accessory to a tube, the clamp comprising:
 a base configured to receive the accessory;
 a first arm rotatably coupled to the base and having an inner surface facing the base and an outer surface opposite the inner surface and facing away from the base, the first arm extending between a first end and a second end;
 a second arm rotatably coupled to the base and having an inner surface facing the base and an outer surface opposite the inner surface and facing away from the base, the second arm extending between a first end and a second end;
 at least one flexible member adjoining the second ends of the first and second arms to define a continuous clamping surface for receiving the tube; and
 a latching system coupled to the first ends of the first and second arms, the latching system including a first set of complementary interfering surfaces and a second set of complementary interfering surfaces, wherein the first set maintains the first and second arms in a rotationally-closed position, and the second set maintains the first and second arms in a laterally-aligned position, the second set being comprised of a circumferentially raised bar on one of the first and second arms and a complementary recess on the other of the first and second arms, and the inner surface of one of the first and second arms is configured to contact the outer surface of the other of the first and second arms when in the rotationally-closed position and the laterally-aligned position, wherein the raised bar is located on the outer surface of one of the first and second arms and the recess is located on the inner surface of the other of the first and second arms.

8. The clamp of claim 7, wherein the first arm includes a length that is substantially equal to a length of the second arm, and the clamping surface has a size substantially identical to an outer diameter of the tube.

9. The clamp of claim 7, further comprising a closure member coupled to one of the first arm and the second arm and cooperating with the latching system to close the clamp, the closure member is positioned radially outward of the latching system.

10. The clamp of claim 7, wherein one of the first or the second arm is comprised of a raised gripping surface.

11. The clamp of claim 10, wherein the raised gripping surface is comprised of an overmolded gripping member.

12. The clamp of claim 7, further comprising a second flexible member coupling the first arm to the base and a third flexible member coupling the second arm to the base.

13. The clamp of claim 12, wherein the first flexible member is looped upward into an opening between the first and second arms, and wherein the first, second and third flexible members maintain the first and second arms in an open position when in an unattached condition and cause the arms to close when in an attached condition.

14. The clamp of claim 7, wherein the raised bar is integral with a recessed portion of the first end of one of the first and second arms.

15. A clamp for coupling an accessory to a tube, the clamp comprising:
a base configured to receive the accessory;
a first arm rotatably coupled to the base and having an inner surface facing the base and an outer surface opposite the inner surface and facing away from the base, the first arm extending between a first end and a second end;
a second arm rotatably coupled to the base and having an inner surface facing the base and an outer surface opposite the inner surface and facing away from the base, the second arm extending between a first end and a second end;
at least one flexible member adjoining the second ends of the first and second arms to define a continuous clamping surface for receiving the tube; and
a closure member coupled to one of the first arm and the second arm and cooperating with a latch to close the clamp, the latch including a first set of complementary interfering surfaces to maintain the first and second arms in a laterally-aligned position, and the first set of complementary interfering surfaces comprises a circumferentially-raised bar defined on the inner surface of one of the first and second arms and a complementary recess configured to receive the circumferentially-raised bar and defined on the outer surface of the other of the first and second arms, wherein the raised bar is located on the outer surface of one of the first and second arms and the recess is located on the inner surface of the other of the first and second arms.

16. The clamp of claim 15, wherein the first arm includes a length that is substantially equal to a length of the second arm.

17. The clamp of claim 15, wherein the latch includes a second set of complementary interfering surfaces, wherein the second set maintains the first and second arms in a rotationally-closed position, and the second set maintains the first and second arms in a laterally-aligned position.

18. The clamp of claim 15, further comprising a second flexible member coupling the first arm to the base and a third flexible member coupling the second arm to the base.

19. The clamp of claim 18, wherein the first flexible member is looped upward into an opening between the first and second arms, and wherein the first, second and third flexible members maintain the first and second arms in an open position when in an unattached condition and cause the arms to close when in an attached condition.

* * * * *